United States Patent
Saban

[19]

[11] Patent Number: 6,002,191

[45] Date of Patent: Dec. 14, 1999

[54] PAIRED INTERLOCKS FOR STACKING OF NON-ROTATED LAMINATION CORES

[75] Inventor: Daniel M. Saban, Fort Wayne, Ind.

[73] Assignee: General Electric Company, Schenectady, N.Y.

[21] Appl. No.: 09/102,123

[22] Filed: Jun. 19, 1998

[51] Int. Cl.[6] .............................. H02K 1/06; H02K 15/02
[52] U.S. Cl. ............................ 310/216; 310/217; 29/598
[58] Field of Search ..................................... 310/216, 217, 310/261, 42, 263, 91; 29/598, 596

[56] References Cited

U.S. PATENT DOCUMENTS

| | | | |
|---|---|---|---|
| 4,900,636 | 2/1990 | Takenouchi et al. | 428/571 |
| 4,979,285 | 12/1990 | Martin | 29/598 |
| 5,075,150 | 12/1991 | Webb et al. | 428/162 |
| 5,142,178 | 8/1992 | Kloster et al. | 310/217 |
| 5,338,996 | 8/1994 | Yamamoto | 310/216 |
| 5,757,108 | 5/1998 | Suzuki | 310/49 R |
| 5,829,120 | 11/1998 | Uchida et al. | 29/598 |

*Primary Examiner*—Nestor Ramirez
*Assistant Examiner*—Tran N Nguyen
*Attorney, Agent, or Firm*—Welsh & Katz, Ltd.; Carl B. Horton, Esq.; Wayne O. Traynham, Esq.

[57] ABSTRACT

A rotor core is formed from a stack of laminations. The core includes a plurality of generally circular laminations in a stacked formation one on top of each other. Each lamination defines an axis collinear with an axis of each other lamination in the stacked formation. The laminations each have first and second surfaces and the stack is configured to define at least one inner lamination having laminations adjacent to both its first and second sides and outer laminations having laminations adjacent to only one of its first and second sides. Each lamination has a predetermined number of circumferencially equally spaced slots that define conductor receiving regions. Each inner lamination includes at least one interlocking projection extending from one of the first and second surfaces thereof, at a predetermined radial distance from the lamination axis. Each lamination further defines at least one projection receiving region formed therein for receiving a projection from an adjacent lamination. When viewing the laminations stacks parallel to the axis, the projections are engaged in their respective projection receiving regions so as to define a staggered path of projection and receiving region engagements through the lamination stack. This staggered path configuration defines an elongated, tortuous path having a length greater than a height of the stack for eddy currents through the lamination stack, to increase impedance of an eddy current path therethrough.

7 Claims, 5 Drawing Sheets

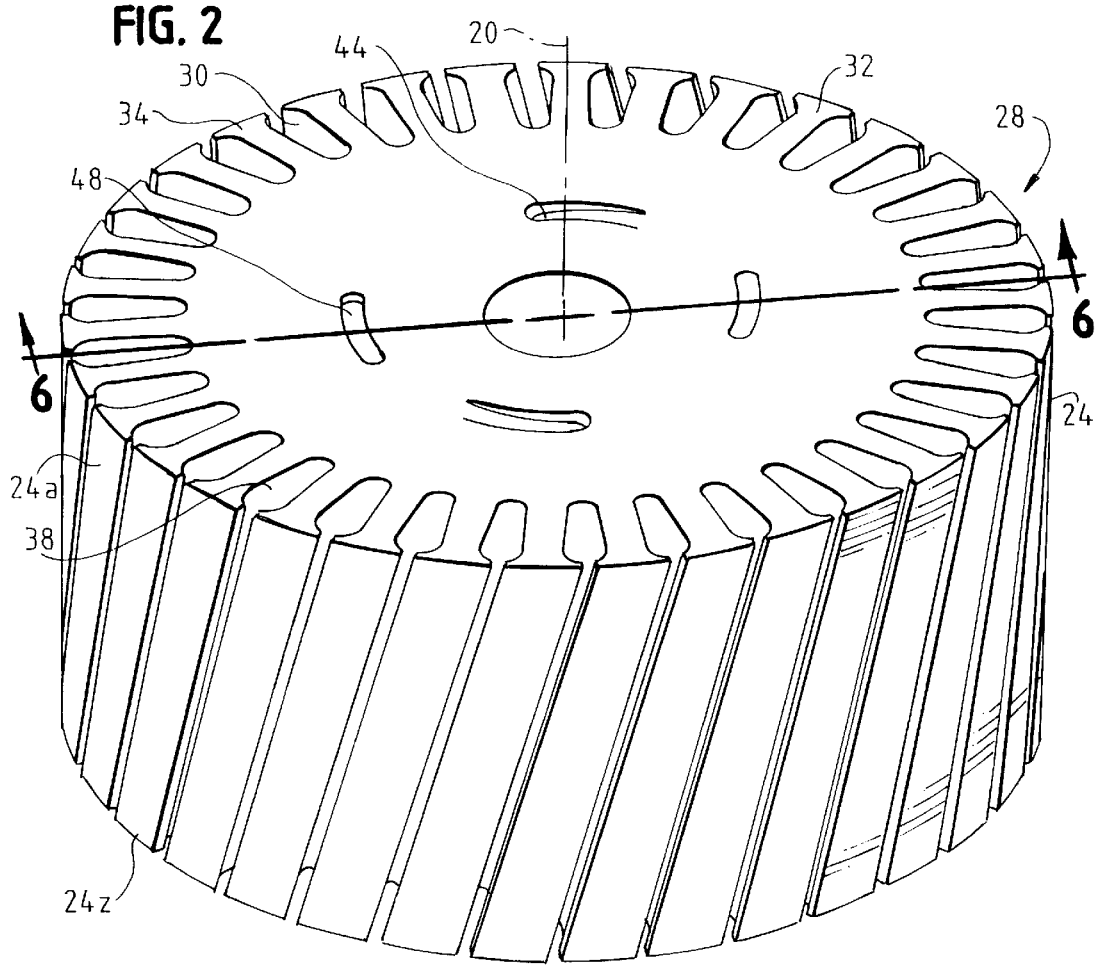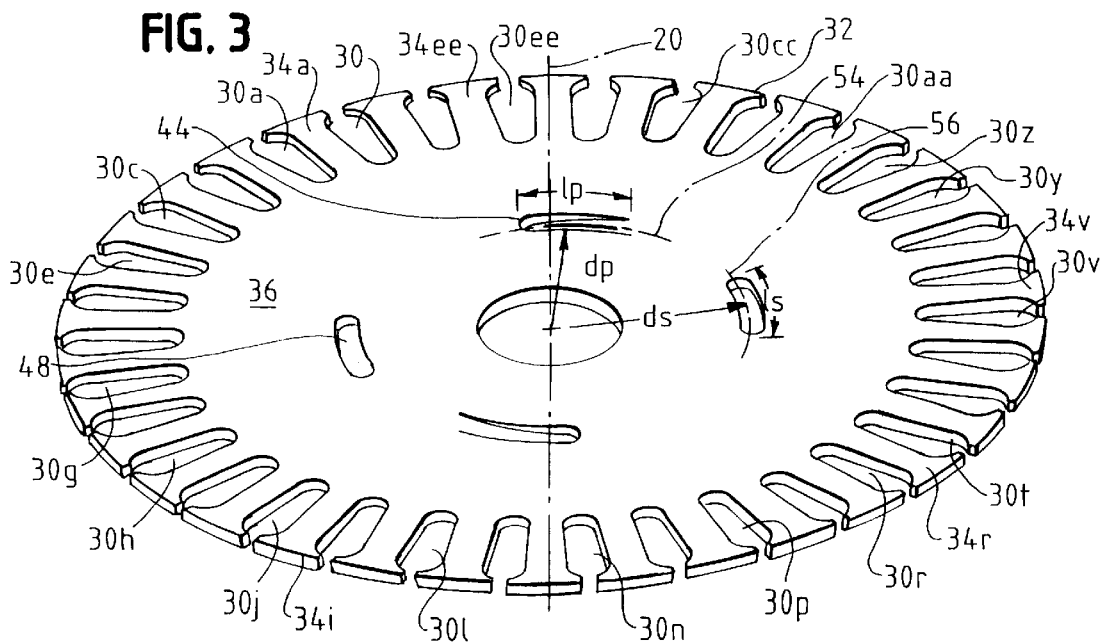

PAIRED INTERLOCKS FOR STACKING OF NON-ROTATED LAMINATION CORES

FIELD OF THE INVENTION

The present invention relates generally to electric motors and more particularly to paired interlocks for the stacking of non-rotated lamination cores, and a method for making such cores.

BACKGROUND OF THE INVENTION

Electrical motors are in vast use and impact every aspect of industrial, commercial and residential life. Such motors can vary from small, fractional motors that can be found, for example, in washing machines and refrigerators, to large industrial applications for driving manufacturing equipment, fans and the like. Motors are commonly used to convert electrical energy into rotating energy or rotational force.

Typically, a motor includes a rotating central portion referred to as a rotor and a stationary outer portion referred to as a stator. The stator and rotor are housed in a housing that contains the motor. Both the rotor and stator contain electrical conducting elements. Rotor and stator cores can be formed with varying numbers of slots, which are the openings that receive the electrical conducting elements.

A rotor core is the central portion of the rotor that contains the conductive elements. The number of bars in rotor cores can vary considerably. In smaller, fractional squirrel-cage motors, for example, those having rotor diameters of about two inches, the number of bars is generally between 8 and 52.

The core structure is typically formed as a plurality of stacked plates or laminations. The laminations, which can be metal, may be punched in a press and subsequently stacked one on top of another to form the core. In some cores, the laminations are rotated relative to one another to account for possible asymmetries in the lamination material. In other, non-rotated cores, the laminations can merely be stacked one on top of another and interlocked with one another to form a rigid core structure, and to prevent the laminations from shifting relative to one another.

In one known interlocking arrangement, each lamination has a dimple or recess punched into the surface, which forms a corresponding projection on the opposite side of the lamination. The laminations are then stacked one on top of the other with the projections from one lamination engaging and resting in the recess in the next adjacent lamination. In this nested arrangement, the laminations are kept in alignment with one another by engagement of the projections and recesses. This is a common and accepted method for interlocking laminations.

Although such known methods are in common practice, they do have their drawbacks. First, this direct nested arrangement provides a relatively short path and thus, a low impedance current path for eddy currents. This, as will be recognized by those skilled in the art, can result in increased electromagnetic losses through the core. This arrangement decreases the efficiency of the motor from which the stator core is constructed.

Accordingly, there continues to be a need for a rotor core lamination interlocking arrangement that readily facilitates manufacture of laminations and rotor cores therefrom which interlocking arrangement creates a high impedance current path for eddy currents to reduce the electromagnetic losses through the rotor.

SUMMARY OF THE INVENTION

A rotor core for use in a rotating dynamoelectric machine is formed from a stack of laminations. The core includes a plurality of generally circular laminations in a stacked formation one on top of another. Each lamination defines an axis that is collinear with an axis of each other lamination in the stack. Each lamination includes first and second surfaces, and the stack is configured to define at least one inner lamination having laminations adjacent to both the first and second sides and outer laminations having laminations adjacent to only one of the first and second sides.

Each lamination is formed with a predetermined number of circumferencially equally spaced slots formed therein. The slots are spaced from adjacent slots so as to define conductor receiving regions. Each inner lamination includes at least one interlocking projection formed in one of the first and second sides, which projection is formed at a predetermined radial distance from the lamination axis. Each projection is formed so as to extend out of a plane of one of the first and second sides. Each lamination further includes at least one projection receiving region or shadow formed therein for receiving a projection from an adjacent lamination.

When viewing the lamination stack parallel to the axis, the projections are engaged in corresponding shadows so as to define a staggered path of projection and shadow engagements through the lamination stack. This staggered path of projection and shadow engagements defines an elongated, tortuous path having a length greater than a height of the stack, for eddy currents through the lamination stack to increase impedance of an eddy path therethrough.

In a preferred core, each lamination includes a plurality of projection receiving regions and a plurality of projections. Preferably, the laminations are configured so that each receiving region can receive any of the projections from an adjacent lamination.

In one configuration, the projection has an elongated, arcuate shape and the projection receiving region has a complementary, elongated, arcuate shape so as to fully receive a projection from an adjacent lamination. The receiving region can have a length that is larger than a length of the corresponding projection.

Other features, benefits and advantages of the present invention will be apparent from the following figures, detailed description, and appended claims.

DESCRIPTION OF THE DRAWINGS

FIG. 2 is a perspective view of a rotor core formed from a stacked plurality laminations including one embodiment of a paired interlocking system;

FIG. 3 is a perspective top view of one of the laminations of the core of FIG.

DETAILED DESCRIPTION OF THE INVENTION

Figure 1:
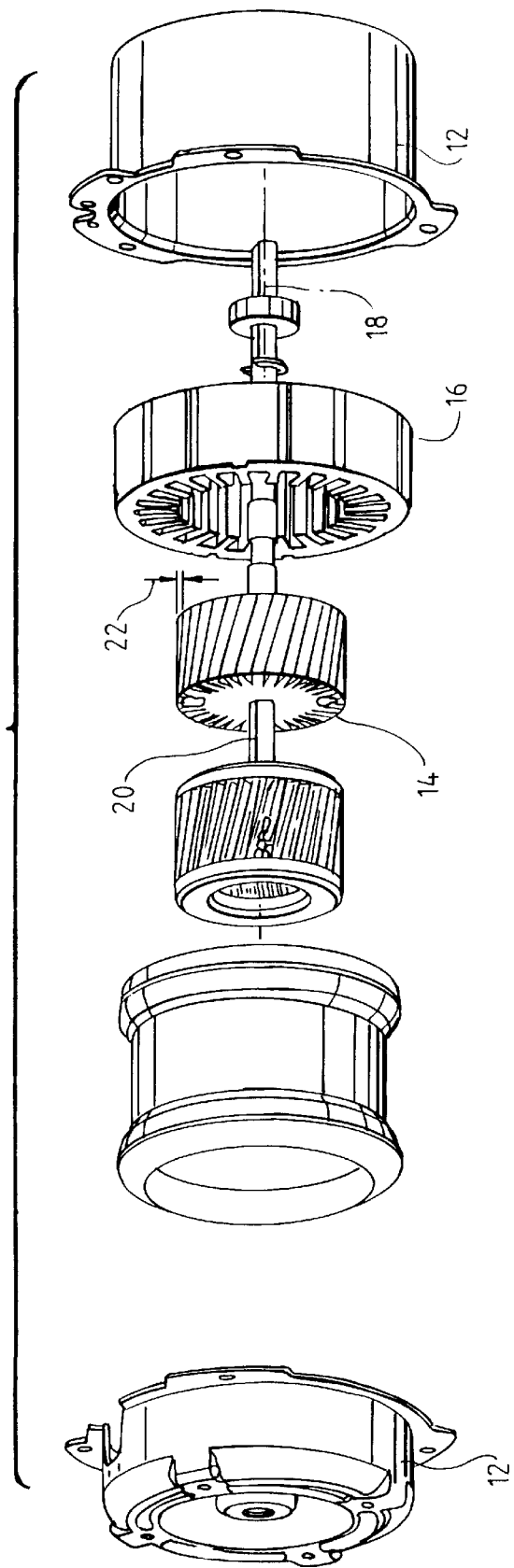
FIG. 1 is an exploded, perspective view of an exemplary motor, illustrating a rotor and having a core formed in accordance with the principles of the present invention.
Figure 4:
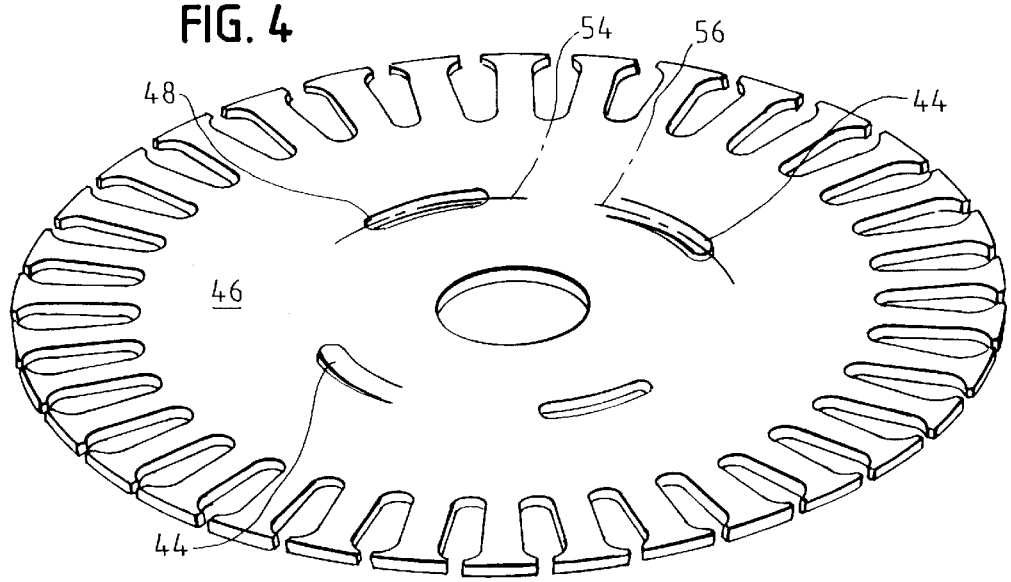
FIG. 4 is a perspective bottom view of the lamination of FIG. 3.

While the present invention is susceptible of embodiment in various forms, here is shown in the drawings and will hereinafter be described presently referred embodiments and methods with the understanding that the present disclosure is to be considered an exemplification of the invention and is not intended to limit the invention to the specific embodiments illustrated and methods described.

Referring now to the figures and in particular to FIG. 1, there is shown a motor generally illustrated at 10. The motor 10 is enclosed within a housing 12 and includes a rotor 14 and a stator 16. The stator 16 is the stationary portion of the motor 10 that is mounted to and within the housing 12. The stator 16 defines a longitudinal axis indicated at 18, therethrough. The rotor 14 is the rotating portion of the motor 10 that is positioned within the stator 16. The rotor 14 also defines a longitudinal axis, indicated at 20, which is aligned with the stator 16 such that the axes 18, 20 of the rotor 14 and stator 16 are collinear.

The rotor 14 is positioned within the stator 16 to define a gap, referred to as an air gap, indicated at 22 therebetween. The gap 22 permits the rotor 14 to freely rotated within the stator 16 without the rotor 14 and stator 16 inadvertently contacting one another. In a typical, small, fractional motor, e.g., less than one horsepower, the gap 22 can be about ten-thousandths of an inch (ten mills).

The rotor 14 is formed of a plurality of plates or laminations 24 that are stacked together one on top of another. The laminations 24 are secured in place relative to one another by an interlocking system indicated generally at 26. The interlocking system 26 prevents the laminations 24 from rotating and shifting relative to one another and from separating from each other, and thus, maintains the core 28 as a unitary member during manufacture.

As illustrated in FIGS. 2 and 3, the core 28 includes a predetermined number of slots 30 formed therein at an edge or periphery 32 of each lamination 24. The slots 30 are defined by teeth 34 that separate the slots 30 from one another. In a typical rotor lamination 24, the teeth 34 are integral with the lamination central portion 36. The spaces between the teeth, that is the slots 30, are configured to receive and secure conducting elements an exemplary one of which is indicated at 38 in FIG. 2, therein. In an exemplary fractional motor, the conductors 38 are each formed as a single mass from, for example, aluminum that has been injected into the slots 30 in molten form. This type of rotor manufacture is commonly referred to as a squirrel-cage motor.

The plates or laminations 24 are generally formed from sheet material, such as sheet steel, that has been stamped in the form of the laminations 24. The individual laminations 24 are then stacked, one on another, to form the core 28. Although some cores 28 are formed using a rotation process wherein each lamination 24 is rotated a predetermined number of degrees relative to the next adjacent lamination 24, certain cores 28 do not require such rotation. Typically, these non-rotated cores 28 can be formed from materials in which the material thickness tolerance is controlled or the cores 28 themselves can be subject to a post-manufacturing turning operation to assure that the core 28 is formed in a symmetrical manner. In some instances, the mass of the core 28 may be too large to rotate the laminations 24, or there simply may not be any need to control the dimensions of the core 28. Nevertheless, such cores 28 still require an interlocking arrangement 26 in order to assure that the laminations 24 are maintained fixed relative to one another.

Figure 5:
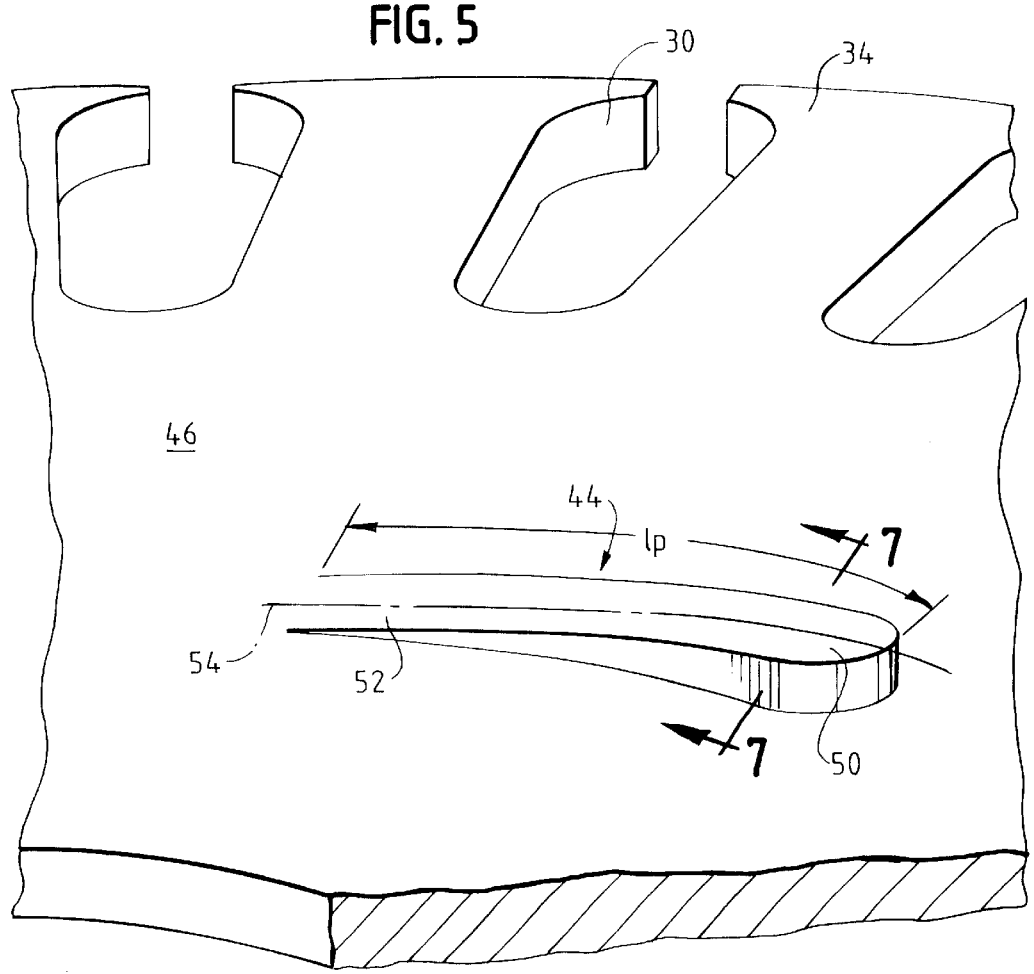
FIG. 5 is an enlarged view of the lamination of FIG. 4, illustrating an interlocking projection.

The present invention uses an interlocking system 26 that includes a raised projection or tab 44 that is formed in a surface 46 of the lamination 24 and a corresponding projection receiving region, opening or shadow 48 in the next adjacent lamination 24 into which the projection or tab 44 resides. In a preferred embodiment, the projection 44 has a lead portion 50 and a trailing portion 52. The lead portion 50 can be stepped as shown in FIG. 5. Essentially the lead portion 50 is the upper most raised portion from the surface 46 of the lamination 24. The trailing portion 52 can taper or ramp downwardly from the lead portion 50, sloping toward the surface 46 of the lamination 24. As best seen in FIG. 5, the projection 44 can define an arcuate shape along its circumferential length as indicated by $L_p$ such that the center line, as indicated at 54, remains at a fixed radial distance $d_p$ from the axis of the lamination, i.e., rotor axis 20.

Unlike known interlocks which use a series of projections that lock or nest into one another in a fixed relation and at fixed position, the projections 44 of the present invention are received in the shadows or openings 48 that are also formed in the lamination 24. The shadows 48 can be elongated to receive the projections 44 along the length of the open region and to thus permit the projection 44 to reside fully within the shadow 48. Similar to the projection 44, the shadow 48 is preferably arcuate such that a center line of the shadow indicated at 56 is at a fixed radial distance $d_s$ from the lamination axis (rotor axis 20) equal to the radial distance $d_p$ of the projection 44 from the axis 20. Preferably, the projections 44 and shadows 48 are paired with one another and each shadow 48 has a circumferential length $L_s$ that is somewhat longer than the length $L_p$ of its corresponding projection 44.

Figure 6:
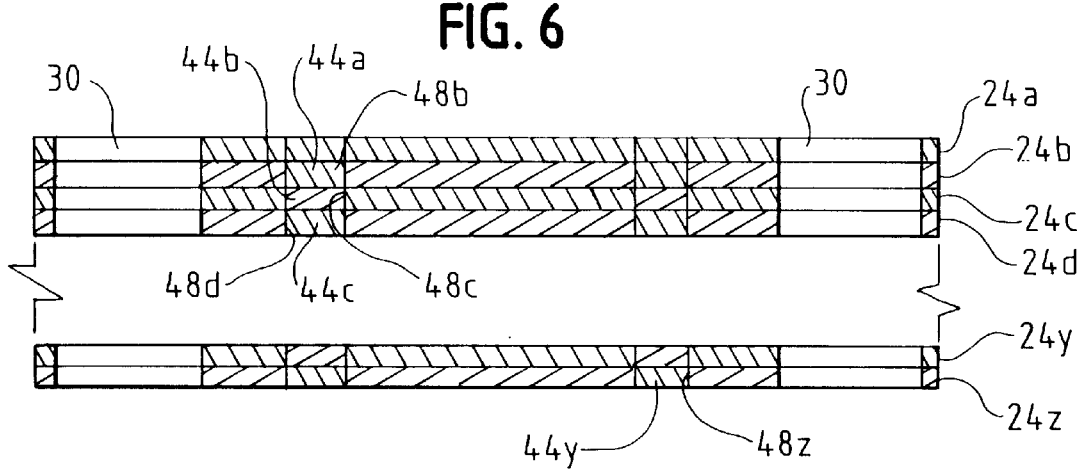
FIG. 6 is a partial cross-sectional view of the lamination stack taken along line 6—6 of FIG. 2.
Figure 7:
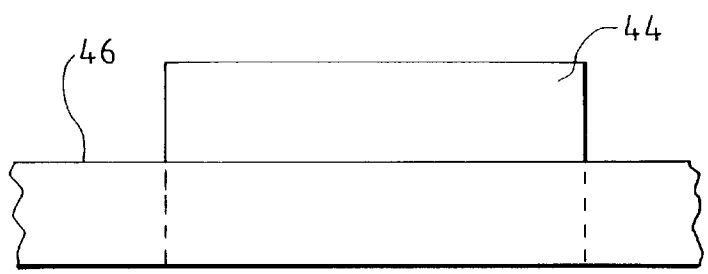
FIG. 7 is a partial cross-sectional view taken along the 7—7 of FIG .5.
Figure 8:
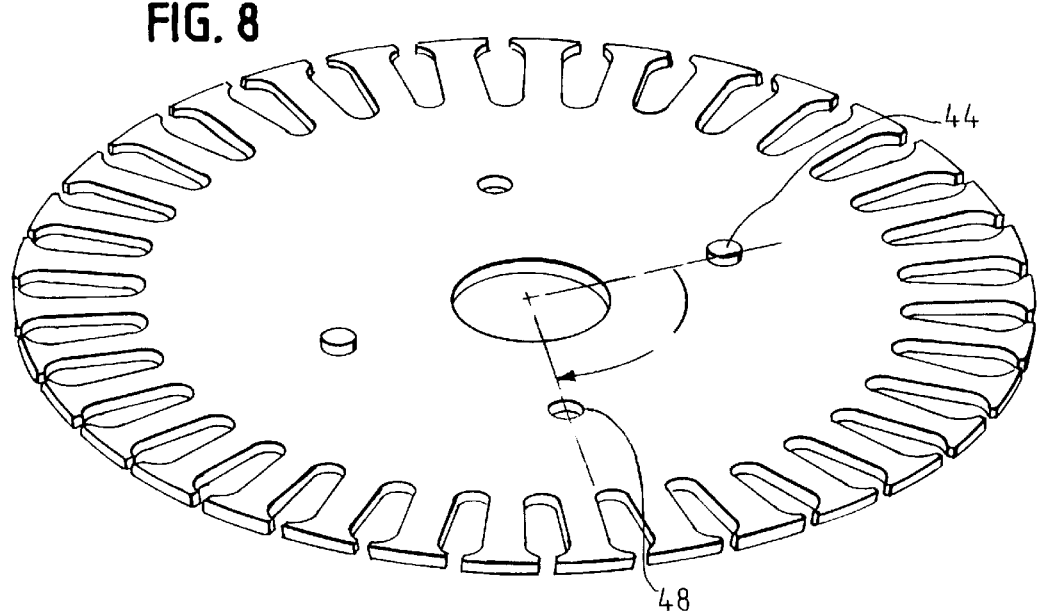
FIG. 8 is a partial perspective view of a lamination that includes an alternate embodiment of the paired interlock system.
Figure 9A:
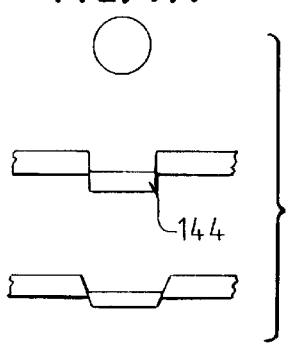
FIGS. 9A–9E illustrate various alternate projection shapes for the interlocking system of the present invention.
Figure 9B:
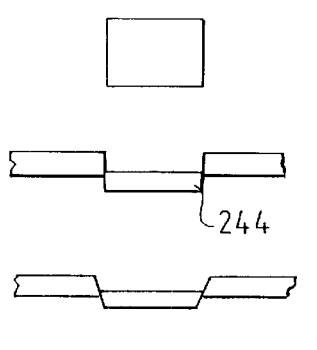
Figure 9C:
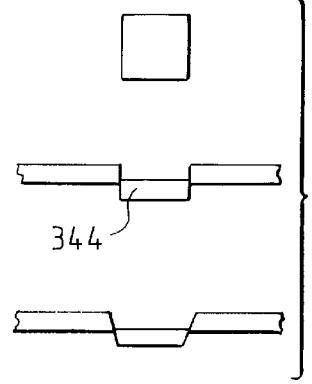
Figure 9D:
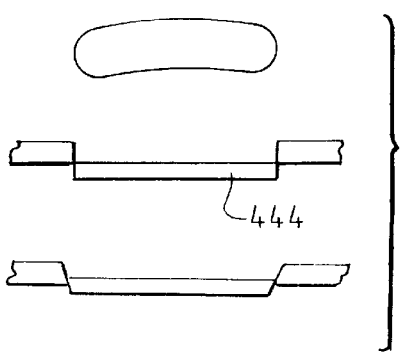
Figure 9E:
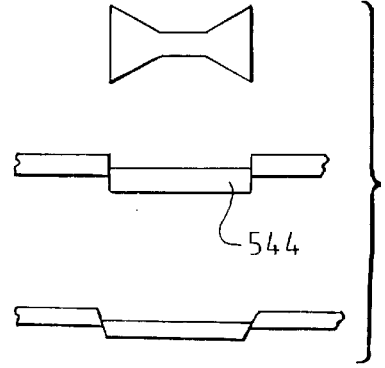

The present invention provides a number of advantages over the known, dimple-projection nesting arrangement. Particularly, the present invention provides a higher impedance current path for eddy currents through the core 28. Those skilled in the art will recognize that this results in a reduction of electromagnetic losses in the core 28, which in turn results in a more efficient motor. More specifically, as illustrated in FIG. 6, each interlock 26 location within a series of laminations 24 alternates between its shadow 48 position and its projection 44 position. As such, the pathway for eddy currents is no longer a straight path through the core 28 as in the dimple-projection nested arrangement, but is a tortuous path resembling a zig-zag configuration rather than a straight-line path through the core 28. This increased path length and the resultant increased resistance to eddy currents reduces the electromagnetic losses through the core. As is apparent from FIG. 6, the path thus created is longer than the height of the lamination 24 stack or core 28.

A wide variety of projections and corresponding shadow shapes can be used in carrying out the present invention. For example, as illustrated in FIGS. 9A–9E, the projections can take the shape of solid raised, circular or oval elements 144, rectangular raised elements 244, square raised elements 344 as well as arcuate, prolate raised elements 444 and "bow-tie" shaped elements 544. As will be apparent for the figures, the shadow configurations 148, 248, 348, 448 and 548 are complementary to the projection configurations 144, 244, 344, 444 and 544, respectively. In a contemplated arrangement, two or more projections 144–544 can be disposed within a single shadow 148–548.

A preferred method for fabricating a rotor core 28 of such laminations 24 includes punching a first lamination 24 with a predetermined number of interlock pair (corresponding projection 44 and shadow 48) locations. Each interlock pair has a projection 44 and a corresponding shadow 48 positioned equidistant from the lamination (i.e., rotor) axis 20. The projection 44 and its corresponding shadow 48 are positioned at a predetermined radial distance from one another or at a predetermined angle α relative to the lamination 24a in (FIG. 2) axis 20. A second lamination, for example, lamination 24b is punched having a predetermined number of projection 44 and shadow 48 pairs. The projections 44 and shadows 48 are in opposing relation to those formed in the first lamination 24a. The second lamination 24b is then stacked on the first lamination 24a, so that the projection 44 from the first lamination 24a resides in the shadow 48 of the second lamination 24b, or the projection 44 from the second lamination 24b resides in the shadow 48 first lamination 24a. Most preferably, a last lamination 24z in the core 28 is formed having only shadows 48 therein and does not include any projections in the lamination 24z.

In that the core 28 is of the "non-rotated" type there is no limitation or restriction as to the number of interlock pairs or the spacing of corresponding projections 44 and shadows 48. As such, the laminations 24 can be formed with any number of corresponding projections 44 and shadows 48 and is limited only in so far as the consistency of the radial distance $d_p$, $d_s$ of the projections 44 and shadows 48 from the lamination axis 20 and the consistency in circumferential distance i.e., angle α between corresponding projections 44 and shadows 48.

In that the core 28 is formed from non-rotated laminations 24, the projections 44 can be used, to some extent, to account for possible asymmetries in the core 28. That is, the projections 44 can be used to "shim" laminations 24 relative to one another to adjust for minor inconsistencies and the like in the lamination material.

From the foregoing it will be observed that numerous modifications and variations can be effectuated without departing from the true spirit and scope of the novel concepts of the present invention. It is to be understood that no limitation with respect to the specific embodiments illustrated or methods presented as intended or should be inferred. The disclosure is intended to cover by the appended claims all such modifications as fall within the scope of the claims.

I claim:

1. A rotor core formed from a stack of laminations comprising:

a plurality of generally circular laminations in a stacked formation on one another, each said lamination defining an axis thereto that is collinear with an axis of each said lamination in said stacked formation, each said lamination have first and second surfaces, the stack being configured to define at least one inner lamination having laminations adjacent to both said first and second sides and outer laminations have laminations adjacent to one of said first and second sides, each said lamination having a predetermined number of circumferentially equally spaced slots formed therein at about an edge of said lamination, each said slot being spaced from slots adjacent thereto so as to define conductor received regions, each said inner lamination including at least one interlocking projection formed in one of said first and second surfaces at a predetermined radial distance from said axis, said at least one projection being formed so as to extend out of a plane of one of said first and second surfaces, each lamination further defining at least one projection receiving region formed therein for receiving a projection from an adjacent lamination, wherein when viewing said lamination stack parallel to said axis, said projections are engaged in said projection receiving regions so as to define a staggered path of projection and receiving region engagements through said lamination stack to define an elongated, tortuous path having a length greater than a height of said stack for eddy currents through the lamination stack to increase impedance of an eddy current path therethrough.

2. The rotor core in accordance with claim 1 wherein each said lamination includes a plurality of projection receiving regions.

3. The rotor core in accordance with claim 2 wherein each said lamination includes a plurality of projections.

4. The rotor core in accordance with claim 1 wherein said at least one projection has an elongated, arcuate shape and wherein said at least one projection receiving region has an elongated, arcuate shape complementary to said at least one projection.

5. The rotor core in accordance with claim 4 wherein said projection receiving region has a length that is longer than a length of its corresponding projection.

6. The rotor in accordance with claim 1 including at least two projections and a projection receiving region corresponding to each of said at least two projections, wherein each said lamination is configured such that each said receiving region receives a corresponding one of the said projections.

7. The rotor core in accordance with claim 1 wherein the at least one projection provides a shim between laminations.

* * * * *